G. H. DAVIS.
MUSIC ROLL SPOOL.
APPLICATION FILED MAY 7, 1909. RENEWED OCT. 20, 1911.
1,036,079.
Patented Aug. 20, 1912.
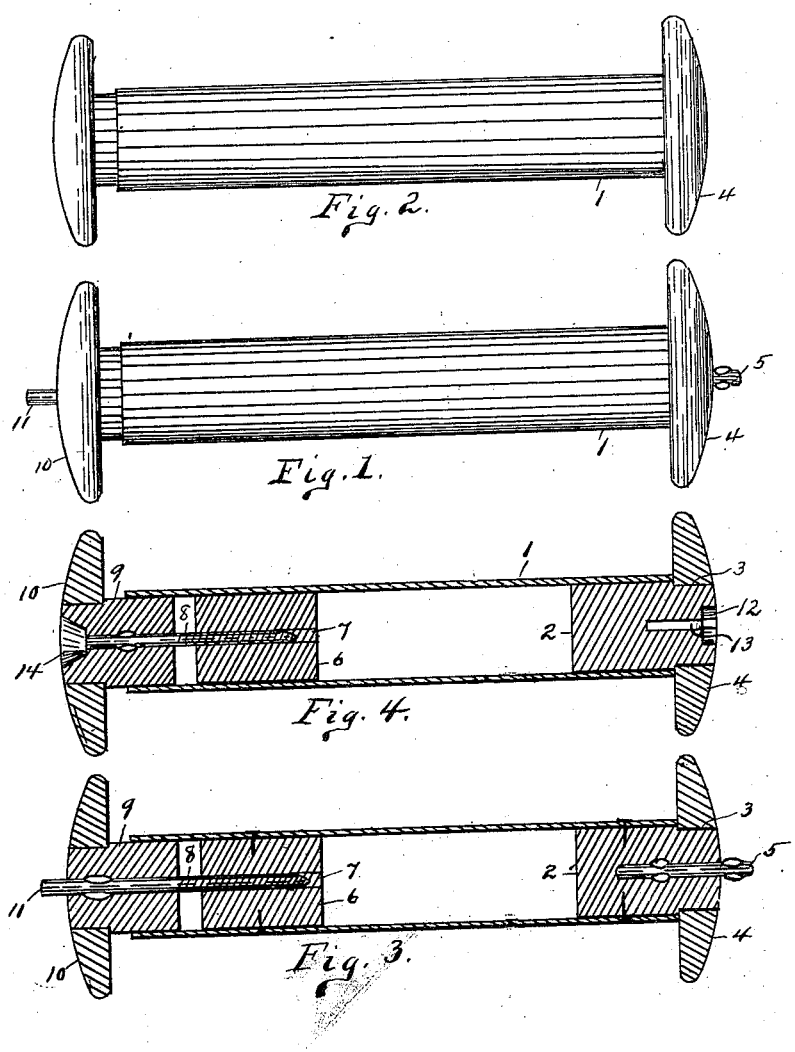

UNITED STATES PATENT OFFICE.

GEORGE HOWLETT DAVIS, OF WEST ORANGE, NEW JERSEY.

MUSIC-ROLL SPOOL.

1,036,079.　　　　　Specification of Letters Patent.　　Patented Aug. 20, 1912.

Application filed May 7, 1909, Serial No. 494,720. Renewed October 20, 1911. Serial No. 655,826.

*To all whom it may concern:*

Be it known that I, GEORGE HOWLETT DAVIS, a citizen of the United States, residing in the town of West Orange, county of Essex, and State of New Jersey, have invented certain new and useful Improvements in Music-Roll Spools; and I declare the following to be a full, clear, and exact description of the same, such as will enable others skilled in the art to which it pertains to make, construct, and use the same.

In my former Patent No. 893571 I have described a standard music roll spool in which the spool body is constructed of wood, having the flange at one end adjustable, so that the effective length of the spool may be varied so as to adapt it to the varying width of the roll as it may be affected by varying temperatures or moisture in the surrounding atmosphere. I have also described in my pending application Ser. No. 480,307 a similarly adjustable spool for what is known as 88 note music.

My present invention is designed as an improvement upon each of these spools, and has for its object not only the reduction of cost in manufacture but also the construction of the spool body of material which will retain its shape under all conditions of atmospheric change, and further provide a spool which will run perfectly true at all times in its bearings A further object of my invention is the utilization of the waste products of music roll manufacture. These waste products consist of strips of the roll material spoiled during the process of perforating or otherwise.

In carrying out my invention, I make use of the structures illustrated in the accompanying drawings in which—

Figure 1, illustrates a plan of a standard spool. Fig. 2, a similar view of an 88 note spool. Fig. 3, is a sectional view of a standard spool. Fig. 4, is a sectional view of an 88 note spool.

Similar letters of reference refer to like parts throughout the specifications and drawings.

The standard spool consists essentially of the main body 1, consisting of the paper tube of suitable dimensions into one end of which is firmly secured the cylindrical wooden plug 2, having a reduced shoulder 3 to receive the spool flange 4. Into the end of the plug 2, is firmly secured the wing pivot 5 as clearly shown in Fig. 3. The plug 2 may be secured in position in any convenient manner as by means of glue or tacks or both. Near the opposite end of tube 1, is a second plug 6, located some distance from the open end, and firmly secured in position either by glue or tacks or both. This plug 6, is provided with a screw-threaded axial aperture 7, to receive the adjusting wing screw 8, which is axially secured in the adjusting plug 9, the latter carrying the other flange 10. The wing screw 8, projects beyond the plug 9, as shown to form the other pivot 11, which with the wing pivot 5, forms the support for the spool, in the supporting bearings in the instrument in which the spool is used.

In the form illustrated in Figs. 2 and 4, the general structure is identical with that just described, and differs only in the form of pivot bearings. The wing pivot 5, of the standard spool is omitted and the plug 2, is provided with a socket 12 and diametrical slot 13. The wing screw is also shortened and no pivot 11 is needed, the conical socket 14, taking its place. The pivot bearings of Figs. 1 and 3, are identical with those of my prior Patent No. 893571 and the pivot bearings of Figs. 2 and 4 are the same as those of my prior application Ser. No. 480,307 and I make no special claim to them herein. In each of the structures it will be noted that the varying space between the adjacent ends of the parts 6 and 9, is protected and there is no chance for the paper of the music roll to become "pinched" between these parts to interfere with the adjustment of the length of the spool; in other words, the first layers of the roll are supported throughout their entire length.

In the use of wooden spool bodies it frequently happens that the wood is often not properly seasoned and therefore warps and gets out of true. The use of the paper tube entirely obviates this, and enables me to construct a spool such that the entire surface thereof is symmetrical with its true working axis. Its use also results in a considerable saving in cost over the wooden spool body, and at the same time I am enabled by it to utilize the valuable features of the micrometric adjustment of my former patent and application.

I claim:

1. In a music roll spool the combination of a tubular spool body, a cylindrical plug permanently secured in one end of said body, a flange secured to said plug permanently, a second plug secured within said body near its other end, a third plug extending within said body and adjustably secured to the second plug, and a spool flange rigidly secured to said third plug.

2. In a music roll spool the combination of a tubular spool body, a plug rigidly and permanently secured within said body near one of its ends, said plug having a screw threaded axial aperture therethrough, an adjusting plug extending into the end of the tubular body, a screw rigidly connected to said adjusting plug and engaging said screw threaded aperture in the first named plug, and a flange permanently secured upon said adjusting plug.

3. In a music roll spool, the combination of a spool body made of paper tube, a cylindrical plug permanently secured within said spool body adjacent one end thereof, a flange-bearing adjusting plug extending into said body and adjustably connected to said first named plug.

4. In a music roll spool the combination of a paper tube spool body, an axially apertured cylindrical plug permanently secured within said body, a flange bearing plug having an axial adjusting screw permanently secured thereto and adjustably engaging the aperture of said first named plug.

This specification signed and witnessed this 5th day of May 1909.

GEORGE HOWLETT DAVIS.

Witnesses:
B. A. MASTERS,
M. VAN NESS.

Copies of this patent may be obtained for five cents each, by addressing the "Commissioner of Patents, Washington, D. C."